UNITED STATES PATENT OFFICE.

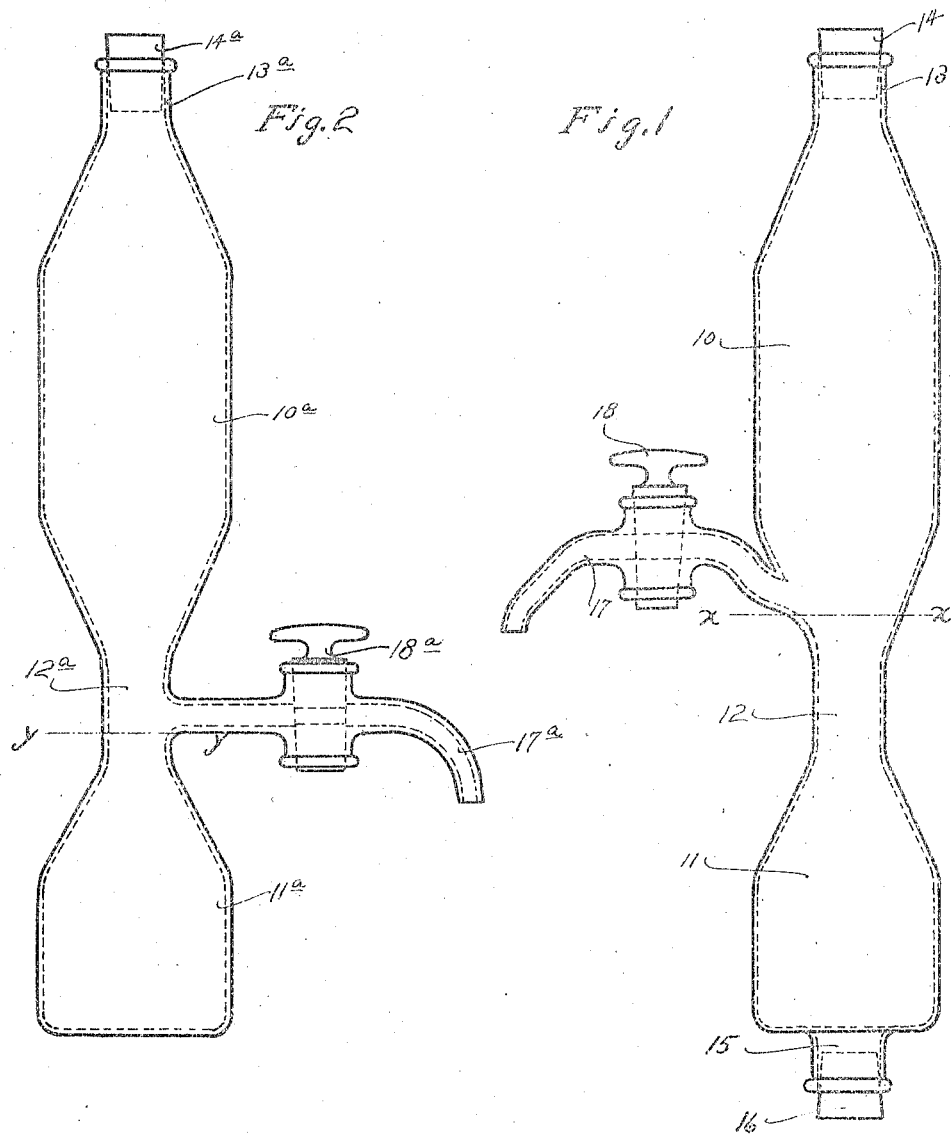

JULIUS JOHN MOJONNIER, OF CHICAGO, ILLINOIS, ASSIGNOR TO MOJONNIER BROS. CO., OF PORTLAND, MAINE, A CORPORATION OF MAINE.

APPARATUS FOR TESTING MILK AND MILK PRODUCTS.

1,255,329.

Specification of Letters Patent.

Patented Feb. 5, 1918.

Application filed April 12, 1915. Serial No. 20,633.

*To all whom it may concern:*

Be it known that I, JULIUS JOHN MOJONNIER, a citizen of the United States, residing at Chicago, in the county of Cook and State of Illinois, have invented and discovered certain new and useful Improvements in Apparatus for Testing Milk and Milk Products, of which the following is a specification.

The present invention relates to an extraction flask for use in a process or test to determine the percentage of fat in milk, cream, milk products, and in fact all dairy products in general.

The process or test with which the present invention is especially used is carried out by mixing the milk or milk product with a fat solvent, at the same time dissolving the albumin, casein, milk-sugar, etc., thereby causing the fat, in solution, to float upon the remainder of the mixture, so that it can be withdrawn, the fat solvent evaporated, and the residue weighed.

The extraction flask forming the subject matter hereof and used in carrying out the above test is designed to permit of a speedy separation of the fat in solution and the ready removal thereof from the flask without disturbing the remainder of its contents. Furthermore, the formation of the flask is such that it may be centrifuged, as well as shaken and otherwise manipulated simultaneously with a number of others like it.

In the drawings:—

Figure 1 is an elevation of the extracting tube used in the present test;

Fig. 2 is a similar view of a modified form thereof.

Referring more particularly to the drawing (Fig. 1), the tube used in extracting the fat from milk or milk products comprises a large or upper chamber 10 connected with a smaller or lower chamber 11 by a contracted portion 12. The large or upper chamber 10 merges into a neck 13, closed by the stopper 14, while the smaller or lower chamber 11 merges into a neck 15, closed normally by a stopper 16. Inasmuch as transparency is desirable, the tube is constructed of glass, while the stoppers 14 and 16 may be of any suitable material capable of being forced into their respective necks.

An outlet tube 17 extends from one end of the contraction 12, and is provided with a stop cock 18 whereby flow through the outlet tube may be interrupted, as desired, during the test. It will be noted that this outlet tube 17 adjacent to the large or upper chamber 10 curves upwardly and at its outer or discharge end curves downwardly, the stop cock 18 being between these two curved portions.

With reference to the form of extracting tube shown in Fig. 2, it will be seen that its general construction is very similar to that form illustrated in Fig. 1, it being provided with a large or upper chamber $10^a$ merging into a neck $13^a$, which is closed by a stopper $14^a$ and connected with a smaller or lower chamber $11^a$ by a contraction $12^a$. This form of tube, however, does not have a neck for the lower chamber $11^a$. An outlet or discharge tube $17^a$ extends from the contraction $12^a$ and is provided with a stop cock $18^a$. This outlet or discharge tube $17^a$ is approximately straight except at its outer end, where it curves downwardly.

In carrying out the present test, five (5) grams of milk or other milk or dairy product is placed in either tube (Figs. 1 or 2), to which is added ammonia water, ethyl alcohol, ligroin, and ethyl ether, in the following proportions:

$6\frac{1}{2}$ c. c. ammonia water.
10 c. c. ethyl alcohol.
25 c. c. ethyl ether.
25 c. c. ligroin.

In carrying out the present process ammonia water, ethyl alcohol, ethyl ether and ligroin are added, preferably in the order named and the flask or tube shaken after each addition.

It has been found that the ammonia water and ethyl alcohol dissolve the albumin, casein, milk sugar, etc., while the ethyl ether and ligroin dissolve the fat and clarify this solution, thereby creating a sharp line of demarcation between the solution of fat and the solution of albumin, casein, milk sugar, etc.

After all of the ingredients have been placed in the tube through the neck (13 or $13^a$) at the upper end of the tube, and the tube shaken as before described, the stopper (14 or $14^a$) is inserted and the tube placed in a centrifuge and centrifuged for approximately one minute, to facilitate the settling. This greatly reduces the time normally consumed in settling the mixture and causes the fat, in solution, to be sharply separated from the other constituents of the mixture. This line of demarcation between the fat, in solution, and the other constituents, is indicated by the line x—x, Fig. 1, and the line y—y, Fig. 2. In the form of extracting tube illustrated in Fig. 1, the level of this line of demarcation x—x can be raised or lowered by the movement of the stopper 16, and by this means the level of the contents of the settling chamber 11 can be adjusted so that it is located nearly on a plane with the lower surface of the outlet or discharge tube 17. As all the fat, in solution, is in the upper chamber (10 or 10$^a$) and the remainder of the mixture in the settling chamber (11 or 11$^a$), the opening of the stop cock (18 or 18$^a$) permits the fat, in solution, to flow from the chamber (10 or 10$^a$) of the extracting tube through the outlet or discharge (17 or 17$^a$).

The fat, in solution, is discharged through filter paper into a previously weighed aluminum dish which rests upon a hot plate, which causes the solution to boil briskly as it enters the dish, thereby driving off the fat solvents (ethyl ether and ligroin). More ligroin and ethyl ether may be placed in the tube, which is again shaken and centrifuged, and the clean solution, containing fat, filtered into the dish resting on the hot plate. This supplemental extraction is repeated twice, to insure the entire removal of the fat from the extracting tube.

The dish with the solvents of the fat almost entirely evaporated is placed on a hot plate at 180° C., where all but approximately 2% of the solvents are driven off or evaporated. This remaining 2% of the solvents is driven off by placing the dish in a vacuum oven at 70° C., carrying at least a 25-inch vacuum for about seven (7) minutes.

After the residue or fat in the dish is perfectly dry, the dish is placed in a special metal desiccator, where it is cooled to the temperature of the chemical balance upon which it was previously weighed, in from four to five minutes. The dish containing the dry residue or fat is then weighed, and from the increase in weight of the dish containing the residue or fat, and the original weight of the sample of milk or dairy product, the percentage or proportion of fat in the sample may be readily calculated.

The entire test does not require over twenty-five (25) minutes and is accurate to within at least .05% in its results, and does not require heat for the original extraction of the fat, and weighs, rather than measures, the result.

What is claimed is:

1. An extraction tube comprising a settling chamber and an extraction chamber communicating through a contraction formed in the tube, and means connected with the contraction for removing the contents of the extraction chamber without disturbing the contents of the settling chamber.

2. An extraction tube comprising an extraction and a settling chamber communicating through a contraction in said tube, and an outlet tube for removing the contents of the extraction chamber.

3. An extraction tube comprising an extraction and a settling chamber communicating through a contraction in said tube, and an outlet or discharge tube connecting with the contraction aforesaid for removing the contents of the extraction chamber without disturbing the contents of the settling chamber.

4. An extraction tube comprising an extraction and a settling chamber communicating through a contraction in said tube, each chamber terminating at its outer end in a neck, closures for said necks, and an outlet or discharge tube communicating with the contraction aforesaid.

5. A tube comprising an upper and a lower chamber communicating one with the other through an open contraction and a fauceted outlet tube coöperating with said contraction for withdrawing the contents of one of said chambers.

6. A flask comprising a tube having its upper and lower ends expanded to create a plurality of inter-communicating chambers, and a discharge means coöperating with chambers at the point of communication therebetween.

7. A flask comprising a plurality of chambers, means of communication therebetween, and an outlet extending upwardly at an angle to said means of communication.

8. A flask comprising a plurality of chambers, means of communication therebetween, and an outlet tube connecting with and extending upwardly at an angle to said means of communication.

In testimony whereof, I have hereunto set my hand in the presence of two subscribing witnesses, on this the 2nd day of April, A. D. 1915.

JULIUS JOHN MOJONNIER.

Witnesses:
CHARLES S. WILSON,
HERMANN R. MENDIUS.